US012198831B2

(12) United States Patent
Graber et al.

(10) Patent No.: US 12,198,831 B2
(45) Date of Patent: Jan. 14, 2025

(54) MIXTURES OF SUPERCRITICAL FLUIDS AS A DIELECTRIC MATERIAL

(71) Applicant: Georgia Tech Research Corporation, Atlanta, GA (US)

(72) Inventors: Lukas Graber, Atlanta, GA (US); Chanyeop Park, Starkville, MS (US); Jia Wei, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 474 days.

(21) Appl. No.: 17/407,829

(22) Filed: Aug. 20, 2021

(65) Prior Publication Data

US 2021/0383944 A1 Dec. 9, 2021

Related U.S. Application Data

(63) Continuation-in-part of application No. 17/128,043, filed on Dec. 19, 2020, now abandoned.

(60) Provisional application No. 62/952,238, filed on Dec. 21, 2019.

(51) Int. Cl.
*H01B 3/16* (2006.01)
*H01B 3/00* (2006.01)
*H01B 17/36* (2006.01)

(52) U.S. Cl.
CPC ............... *H01B 3/16* (2013.01); *H01B 3/002* (2013.01); *H01B 17/36* (2013.01)

(58) Field of Classification Search
CPC ........................................................ H01B 3/16
USPC .............................................................. 174/8
See application file for complete search history.

(56) References Cited

U.S. PATENT DOCUMENTS 10,568,196 B1 * 2/2020 Nguyen .................... H05H 9/02
2004/0146636 A1 * 7/2004 DeYoung .......... H01L 21/67028 257/E21.174
2004/0266184 A1 * 12/2004 RamachandraRao ........................ H01L 21/76826 438/689
2010/0047292 A1 * 2/2010 Tsung .................. A61K 9/1682 514/4.8
2014/0321024 A1 * 10/2014 Smoot .................... H02N 15/02 361/225
2019/0245330 A1 * 8/2019 Loray .................. H01H 33/562
2020/0212435 A1 * 7/2020 Okochi ................. H01M 4/622
2021/0098946 A1 * 4/2021 Davis ........................ H02J 7/00

* cited by examiner

*Primary Examiner* — Stanley Tso
(74) *Attorney, Agent, or Firm* — Bryan W. Bockhop; Bockhop Intellectual Property Law, LLC

(57) ABSTRACT

A dielectric material with heat transfer properties includes a first fluid and a second fluid different from the first fluid and miscible with the first fluid. The first fluid and the second fluid are mixed with each other so as to form a mixture and are kept at a temperature and a pressure so that the mixture is maintained in a supercritical phase. The mixture has at least one parameter that is preferably different from a corresponding parameter in both a supercritical phase of the first fluid and a supercritical phase of the second fluid. In a method of insulating electrical contacts and removing heat therefrom, the mixture is disposed about the electrical contacts and is maintained at a temperature and at a pressure that causes the mixture to be in a supercritical phase so that the mixture has favorable dielectric and heat transfer properties.

17 Claims, 6 Drawing Sheets

| | Optical cell | | PSRK model | |
|---|---|---|---|---|
| ω | $T_c$ [K] | $p_c$ [MPa] | $T_c$ [K] | $p_c$ [MPa] |
| 0.1 | 300.0 | 6.75 | 297.5 | 6.73 |
| 0.25 | 294.5 | 6.50 | 292.0 | 6.35 |
| 0.3 | 294.0 | 6.05 | 291.2 | 5.94 |
| 0.4 | 293.5 | 5.82 | 291.5 | 5.70 |
| 0.5 | 293.0 | 5.55 | 292.0 | 5.52 |

FIG. 9A

MIXTURES OF SUPERCRITICAL FLUIDS AS A DIELECTRIC MATERIAL

CROSS-REFERENCE TO RELATED APPLICATION(S)

This application is a continuation-in-part of, and claims the benefit of, U.S. patent application Ser. No. 17/128,043, filed Dec. 19, 2020, the entirety of which is hereby incorporated herein by reference.

This application claims the benefit of U.S. Provisional Patent Application Ser. No. 62/952,238, filed Dec. 21, 2019, the entirety of which is hereby incorporated herein by reference.

STATEMENT OF GOVERNMENT SUPPORT

This invention was made with government support under grant number DE-AR0001113, awarded by the Department of Defense. The government has certain rights in the invention.

BACKGROUND OF THE INVENTION

1. Field of the Invention

The present invention relates to dielectric materials and, more specifically, to dielectric materials that include a supercritical mixture of fluids.

2. Description of the Related Art

A dielectric material is an electrical insulator that can be polarized by an applied electric field. When a dielectric material is placed in an electric field, electric charges do not flow through the material as they do in an electrical conductor. Dielectric materials are commonly used in applications in which two or more conductors are to be electrically insulated from each other but in which an electric field between the conductors is desired.

Common dielectric materials include solids, liquids and gases. A vacuum can act as a dielectric is some applications. Some examples of solid dielectric materials used in electrical applications include: porcelain, glass, and most plastics. Air, nitrogen and sulfur hexafluoride are the three most commonly used gaseous dielectrics. Liquid dielectric materials include oils, such a mineral oil, which is used inside electrical power transformers. Such liquid dielectric materials tend to have higher heat transfer rates than solid and gaseous dielectrics and, therefore, they are used in which cooling of an electrical device is desirable. Liquid dielectrics are often used to prevent corona discharge and increase capacitance.

The properties of traditional dielectric media have been a major limiting factor impacting the design and operation of many applications including particle accelerators, x-ray radiography, radiotherapy systems, high energy switching applications and electrical power systems.

In many applications, it is desirable to have dielectrics that: (1) withstand strong electric fields; (2) dissipating heat efficiently, and (3) allowing for fast and efficient motion of the components of the system.

Therefore, there is a need for a dielectric material that is an effective insulator, that transfers heat efficiently and that has low viscosity.

SUMMARY OF THE INVENTION

The disadvantages of the prior art are overcome by the present invention which, in one aspect, is a dielectric material with heat transfer properties that includes a first fluid and a second fluid. The second fluid is different from the first fluid and is miscible with the first fluid. The first fluid and the second fluid are mixed with each other so as to form a mixture and are kept at a temperature and a pressure so that the mixture is maintained in a supercritical phase. The mixture has at least one parameter that is preferably different from a corresponding parameter in both a supercritical phase of the first fluid and a supercritical phase of the second fluid.

In another aspect, the invention is an electrical device that includes a first conductive surface and a second conductive surface spaced apart from the first conductive surface. A fluid mixture is disposed between and is in contact with the first conductive surface and second conductive surface. The fluid mixture includes a first fluid and a second fluid that is different from the first fluid. A container maintains the fluid mixture at a temperature and a pressure so that the mixture is kept in a supercritical phase.

In yet another aspect, the invention is a method of insulating electrical contacts and removing heat therefrom. A first fluid is mixed with a second fluid that is different from the first fluid and that that is miscible with the first fluid so as to form a mixture. The mixture is disposed about the electrical contacts. The mixture is maintained at a temperature and at a pressure that causes the mixture to be in a supercritical phase so that the mixture has favorable dielectric and heat transfer properties.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 9A is a table of experimental results showing a comparison of the critical temperature $T_c$ and critical pressure $p_c$ for $\omega C_2H_6+(1-\omega)CO_2$.

DETAILED DESCRIPTION OF THE INVENTION

Figure 1:
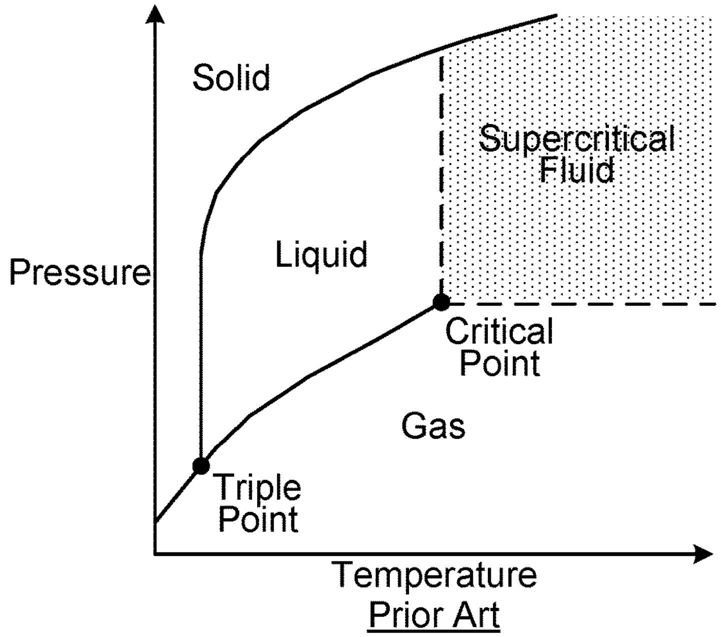
Prior Art FIG. 1
FIG. 1 is a phase diagram showing prior art phases of matter.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The phase diagram shown in FIG. 1, demonstrates how matter can exist in several different phases, including solid, liquid and gas—the three common phases of matter—which can exist together at the "triple point." However, when the temperature/pressure regime of a material exceeds a critical point, the material can exist as a supercritical fluid (SCF). In the supercritical phase, the constituent molecules of a fluid form separate independent clusters that move freely with respect to each other. Supercritical fluids tend to exhibit the low viscosity and dielectric properties of a gas and the high thermal conductivity of a liquid. SCFs tend to combine the properties of high dielectric strength, low viscosity, and excellent heat transfer capability.

The inventors of the present invention have found that supercritical phase mixtures of certain fluids give rise to a high dielectric strength, low viscosity and high heat transfer characteristics. One representative example includes a supercritical fluid mixture of carbon dioxide ($CO_2$) and ethane ($C_2H_6$) in an azeotropic mixture. In an experimental embodiment, certain mixing ratios resulted in an ideal compromise between dielectric performance and critical points, which can enable selectivity and applicability for a wide range of applications including those mentioned above. The first and second fluids, in certain embodiments, can include: sulfur hexafluoride; carbon dioxide; oxygen; hydrogen; trifluoroiodomethane; perfluoropentanone; perfluorohexanone; perfluoronitrile; hexafluoroethane; tetrafluoromethane; perfluoropropane; octafluorocyclobutane; ethane; and combinations thereof. As will be recognized by those of skill in the art, other fluids can also be employed without departing from the scope of the invention. In one experimental embodiment, the mixture included 60% carbon dioxide and 40% ethane by volume. In another experimental embodiment, the first fluid included carbon dioxide and wherein the second fluid included oxygen (for example, 80% carbon dioxide and 20% oxygen by volume). In one mixture, $CO_2$ can be used as the first fluid (the base) with trifluoroiodomethane (CF3I) used as the second fluid to raise the dielectric strength, and oxygen ($O_2$) added to reduce carbon deposits after arcing.

The following table sets forth some of the important properties of the fluids discussed above:

| | Molecular formula | GWP | Dielectric strength compared to $CO_2$ | Tc (K) | Pc (MPa) | Toxicity | Flammability |
|---|---|---|---|---|---|---|---|
| Sulfur hexafluoride | $SF_6$ | 22,800 | +++ | 318.72 | 3.76 | Non-toxic | Non-flammable |
| Carbon dioxide | $CO_2$ | 1 | 1 | 304.25 | 7.38 | Non-toxic | Non-flammable |
| Oxygen | $O_2$ | — | + | 154.6 | 4.98 | Non-toxic | Non-flammable |
| Hydrogen | $H_2$ | 5.8 | ? | 33 | 1.3 | Non-toxic | Flammable |
| Trifluoroiodo-methane | $CF_3I$ | 0.4 | +++ | 395.15 | 4.04 | Low-toxic | Non-flammable |
| Perfluoro-pentanone | $C_5F_{10}O$ | 1 | +++ | 419 | 2.14 | Non-toxic | Non-flammable |
| Perfluoro-hexanone | $C_6F_{12}O$ | 1 | +++ | 441.8 | 1.87 | Non-toxic | Non-flammable |
| Perfluoro-nitrile | $C_4F_7N$ | 2,100 | ++++ | 395 | 2.5 | Non-toxic | Non-flammable |
| Hexafluoro-ethane | $C_2F_6$ | 12,200 | + | 293 | 3.1 | Non-toxic | Non-flammable |
| Tetrafluoro-methane | $CF_4$ | 6,630 | + | 227 | 3.7 | Low-toxic | Non-flammable |
| Perfluoro-propane | $C_3F_8$ | 8,830 | ++ | 345 | 2.6 | Non-toxic | Non-flammable |
| Octafluoro-cyclobutane | $C_4F_8$ | 10,300 | ++ | 388.2 | 2.78 | Non-toxic | Non-flammable |
| Ethane | $C_2H_6$ | 5.5 | – | 305.3 | 4.9 | Non-toxic | Flammable |

The following should be noted: The decomposition products of sulfur hexafluoride can be extremely toxic. Carbon dioxide is typically used as a base fluid in many embodiments. Hydrogen can be added to increase thermal conductivity and increase arc stability in the mixture. Ethane can be used in an azeotropic mixture with $CO_2$ to reduce the critical temperature of the mixture.

Applicants have discovered an unexpected result in that a $CO_2$ and $C_2H_6$ mixture has a lower critical temperature than either $CO_2$ or $C_2H_6$ by itself. This lower temperature can be favorable in applications in which operating at room temperature, or near-room temperature, is desirable. The heat transfer coefficient of a $CO_2/C_2H_6$ azeotropic mixture falls between the values for pure $CO_2$ and $C_2H_6$, which indicates that such a mixture can be used effectively as an alternative fluid in heat power cycles.

In certain embodiments, oxygen can be added to prevent carbon build up due to decomposition of carbon dioxide. In certain embodiments, hydrogen can be used in arcing environments as hydrogen has high thermal conductivity and tends to extinguish arcs. In non-arcing conditions, fluorinated compounds can prevent carbon deposits in high thermal conditions.

Figure 2:
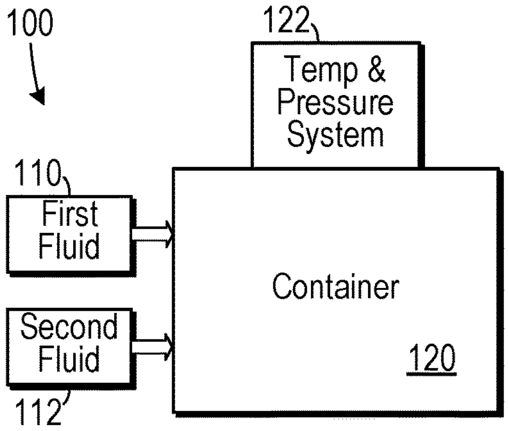
FIG. 2 is a schematic diagram of one representative embodiment of a system employing a supercritical fluid mixture dielectric.
Figure 3:
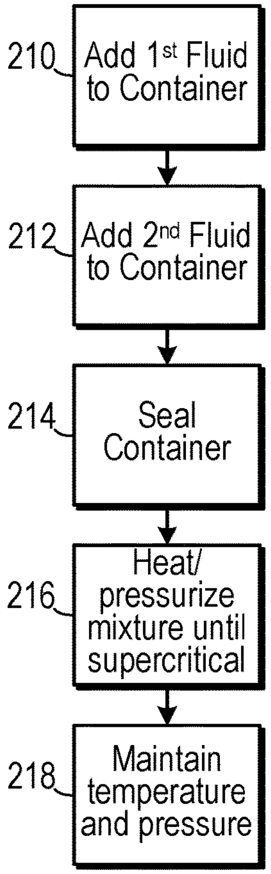
FIG. 3 is a flow chart demonstrating one representative method of making a supercritical fluid mixture dielectric.

As shown in FIG. 2, in a representative embodiment of a dielectric system 100, a first fluid 100 and a second fluid 112 are put into a container 120 to form a mixture. A regulating system 122 maintains the mixture inside the container 120 in a supercritical phase. In a basic method, as shown in FIG. 3, the first fluid is added to the container 210 and the second fluid is added to the container 212 (typically, while both fluids are still in a sub-critical phase, such as a gaseous phase). The container is then sealed 214 with a fluid-tight seal and the mixture is heated or pressurized (or both) until it is in the supercritical phase 216. The container is then maintained at the temperature and pressure to keep the mixture in the supercritical phase 218 so as to use the mixture as a dielectric material with excellent heat transfer properties. Applicants have found that use of such mixtures have certain parameters that are superior to those of the first and second fluids in a supercritical phase by themselves.

Figure 4:
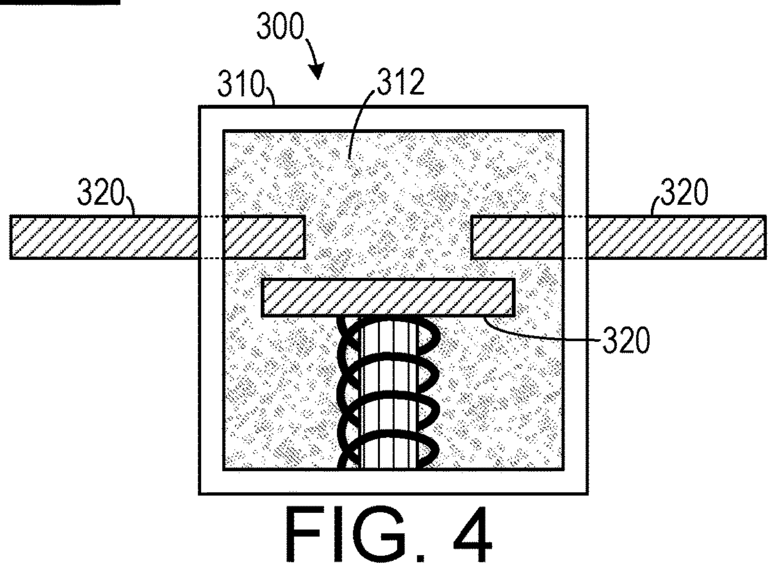
FIG. 4 is a schematic diagram of one representative embodiment of an electrical device employing a supercritical fluid mixture dielectric.

One embodiment, as shown in FIG. 4, includes an electrical device 300 that includes a plurality of conductive surfaces 320 disposed in a container 310 that is filled with a mixture 312 of fluids, which is maintained at a supercritical phase. Such an electrical device 300 could include, for example, a switching device such as a disconnect switch or a circuit breaker, a Van de Graaff generator or an electrostatic motor (or generator).

Figure 5:
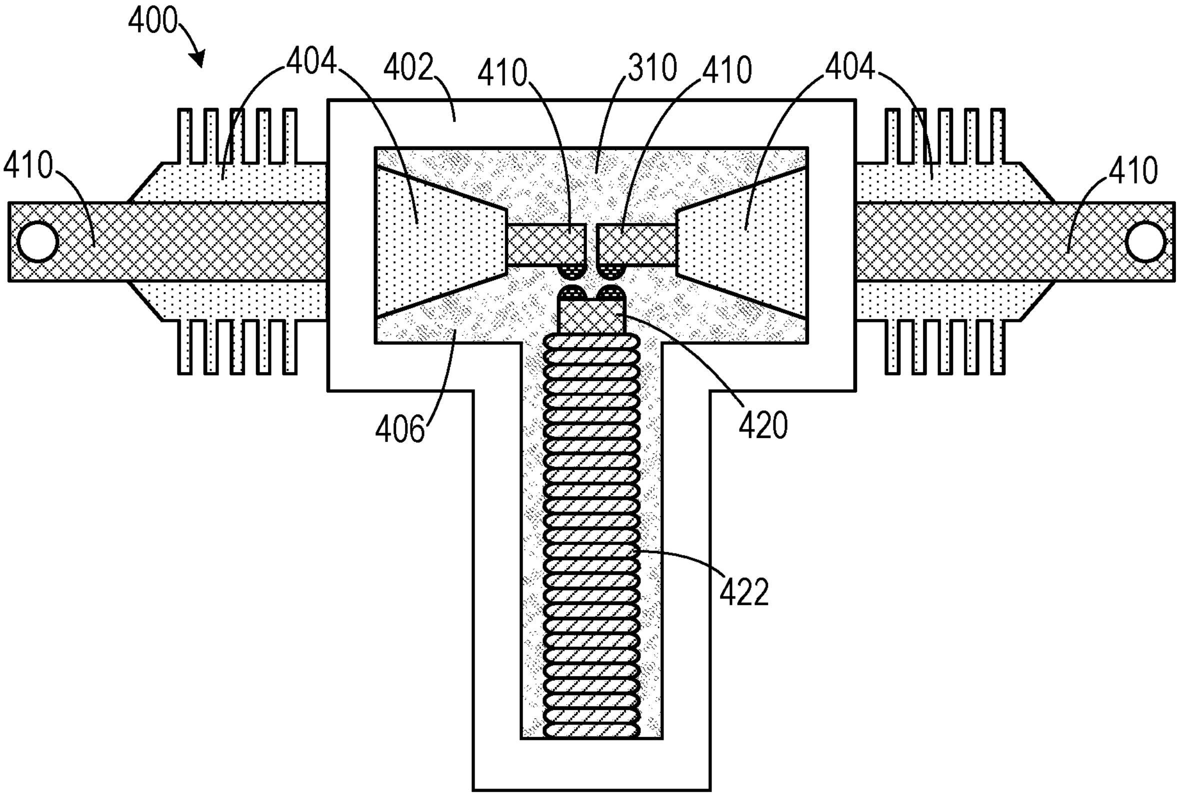
FIG. 5 is a schematic diagram of a high speed disconnect switch employing a supercritical fluid mixture dielectric.

One example of a fast mechanical switch 400 (i.e., high speed disconnect switch), as shown in FIG. 5, can employ an piezoelectric actuator 422 to couple the conductive surfaces of two primary conductors 410 with the conductive surface of a secondary conductor 420. A pair of insulators 404 isolates the conductors 410 from the container 402, which keeps the supercritical fluid mixture 310 in a supercritical phase in a high pressure chamber 406 defined by the container 402.

Figure 6:
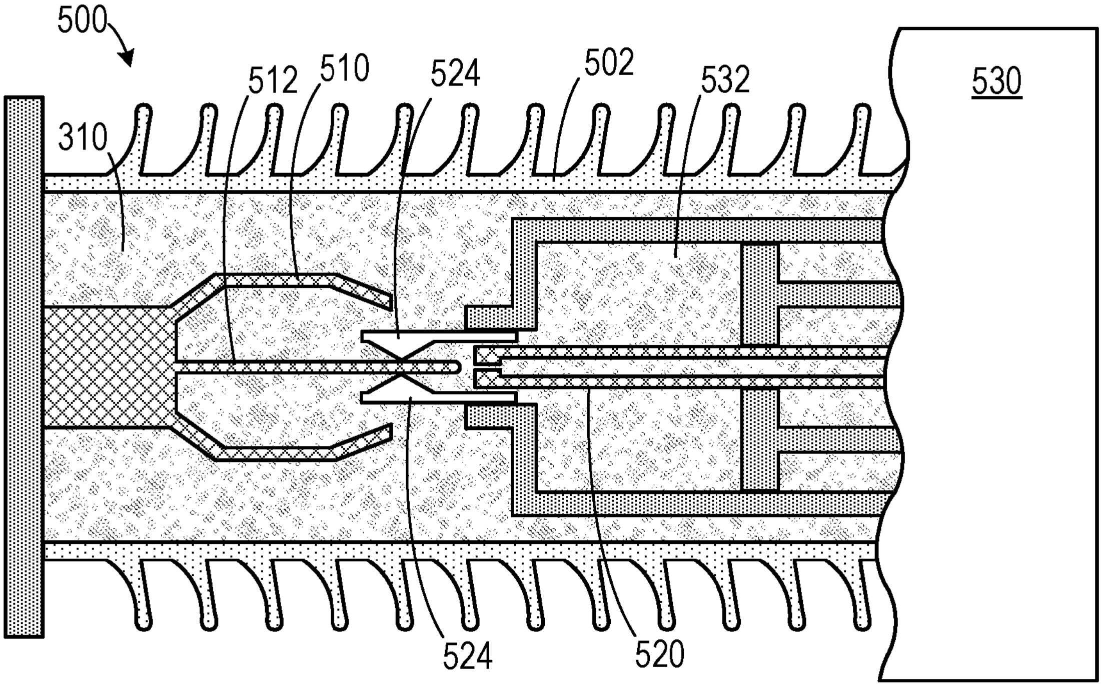
FIG. 6 is a schematic diagram of a circuit breaker employing a supercritical fluid mixture dielectric.

One example of a circuit breaker 500, as shown in FIG. 6, includes a container 502 filled with a fluid mixture 310 in a supercritical state. A fixed main contact 510 and a fixed arcing contact 512 are disposed in the container 502. A moving arcing contact 520 is also disposed in the container 502 and is driven by a piston drive mechanism 530. Dielectric nozzles 524 direct the dielectric fluid from a compression volume 532 to the contacts.

Figure 7:
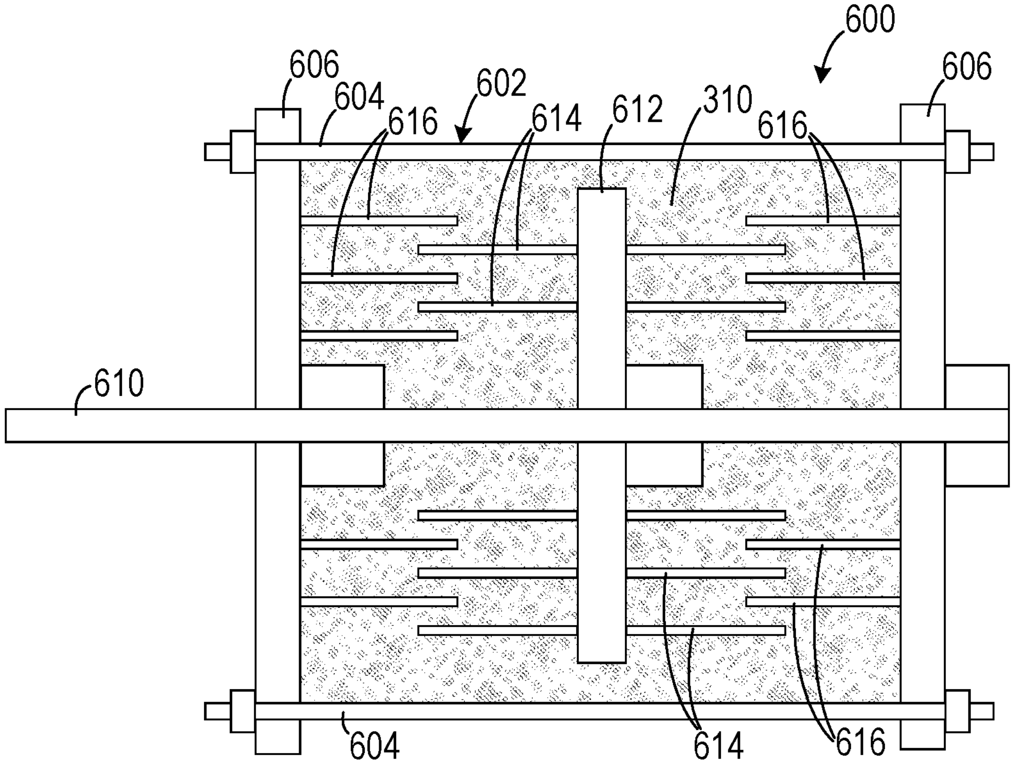
FIG. 7 is a schematic diagram of an electrostatic motor employing a supercritical fluid mixture dielectric.
Figure 8:
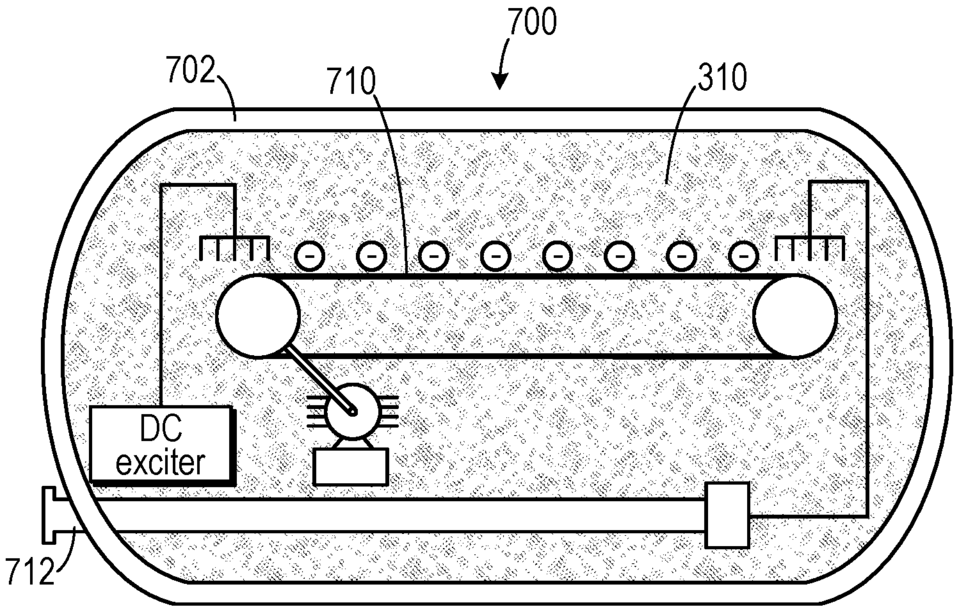
FIG. 8 is a schematic diagram of a Van de Graaff generator employing a supercritical fluid mixture dielectric.

One example of an electrostatic motor 600, as shown in FIG. 7, includes a container 602 formed from two insulating stator plates 606 coupled to a plate spacer 604 and filled with a fluid mixture 310 in a supercritical phase. A plurality of stator elements 616 extend inwardly from the insulated stator plates 606. A shaft 610 supports a rotor plant 612, from which a plurality of rotor elements 614 extends. The rotor elements 614 are interleaved with the stator elements 616. This type of system can also be configured as an electrostatic generator. A particle accelerator system 700 is shown in FIG. 8 and includes a high pressure vessel container 702 filled with a fluid mixture 310 in a supercritical phase. A particle accelerator, such as a Van de Graaff generator 710, is disposed inside the container 702. A particle accelerating tube 712, from which an ion beam can exit the system, extends through the container 702.

It has been found that breakdown voltage increases with the density of $CO_2$, and scatters more in the supercritical region. A discontinuity of slope can be observed near the critical point where the substance experiences phase change. In a supercritical phase, the composition of the fluid is characterized by inhomogeneity in the molecular distribution due to the distinct clusters of molecules. Under the conditions close to the critical point, the density fluctuation $F_D$ increases substantially due to repeated aggregation and dispersion of clusters, which influences the breakdown strength significantly. The density fluctuation $F_D$ is defined by:

$$F_D = \frac{\langle (N - \langle N \rangle)^2 \rangle}{\langle N \rangle} = \frac{(n_s V)^2}{n_{ave} V} = \frac{k_T}{k_T^0}$$

where N is the total number of particles in a given volume V, and $\langle N \rangle$ is the average of N, $n_s$ is the standard deviation of the local number density, $n_{ave}$ is the average number density, $k_T$ is the isothermal compressibility, and $k_T^0$ is the value of $k_T$ for an ideal gas. A larger $F_D$ results in larger density fluctuations, and $F_D$ reaches local maxima at the critical point.

Experiments were conducted at a constant temperature of 308 K, and breakdown voltages were measured for fluids from gaseous to supercritical conditions. Both pure fluids and mixtures of fluids were studied to determine the critical points of mixtures with different mixing ratios so that the thermodynamic phase inside the high pressure chamber container were confirmed. The observed critical points of mixtures were in good agreement with the critical points calculated from the predictive Soave-Redlich-Kwong (PSRK) model for supercritical fluids.

The density inhomogeneity is caused by the clustering effect, which forms a large mean free path where electrons can gain enough energy to ionize particles. Although the phenomenon of the discontinuity in breakdown versus density near the critical point in the experiment can be pronounced, a decrease in breakdown voltage between two electrical contacts in a supercritical fluid mixture near the critical point was not observed by the inventors. This was expected because the gap length between the contacts in the experimental study was relatively large, so that even the discharges happened under the condition of being close to the critical point, and clustering and density fluctuation $F_D$ decreased due to the local increase of the temperature caused by discharges. If the gap length is smaller than 1 μm, the cluster structure can be preserved because more effective heat dissipation is enabled by the large specific surface area. Thus resulting in a reduction of breakdown voltage.

In the experimental study, the state of mixture inside the high pressure chamber was determined by observation through an optical cell and the critical points of mixtures with different mixing ratios were determined. The critical line for $CO_2/C_2H_6$ mixtures was determined and then compared the PSRK model. The PSRK model was able to reliably predict the thermodynamic properties of carbon dioxide and alkanes by using one pair of temperature-dependent group interaction parameters.

A comparison of the critical points observed from the optical cell and calculated from the PSRK model with respect to the mass fraction is shown in FIG. 9A. An error between two methods was expected as being caused in part due to the presence of impurities.

To ensure consistency in the experimental results with the pure $CO_2$ data, the gap between two copper electrodes was set to 0.1 mm. $C_2H_6$ mass percentages of 10%, 25% (azeotropic), 30%, 40%, and 50% were tested in the breakdown experiment. An oily substance between two electrodes was observed after the first breakdown when the $C_2H_6$ mass percentage (w) reached beyond 60%. Experiments to determine the decomposition of $C_2H_6$ under dielectric-barrier discharges found primary decomposition products, which included molecular hydrogen ($H_2$), methane ($CH_4$), acetylene ($C_2H_2$), and ethylene ($C_2H_4$). A similar phenomenon in that organic compounds were formed under the influence of electric discharges with $C_2H_6$ was also observed. These results indicated that the product caused by the electric discharge could be a highly cross-linked polyethylene-type polymer.

Figure 9B:
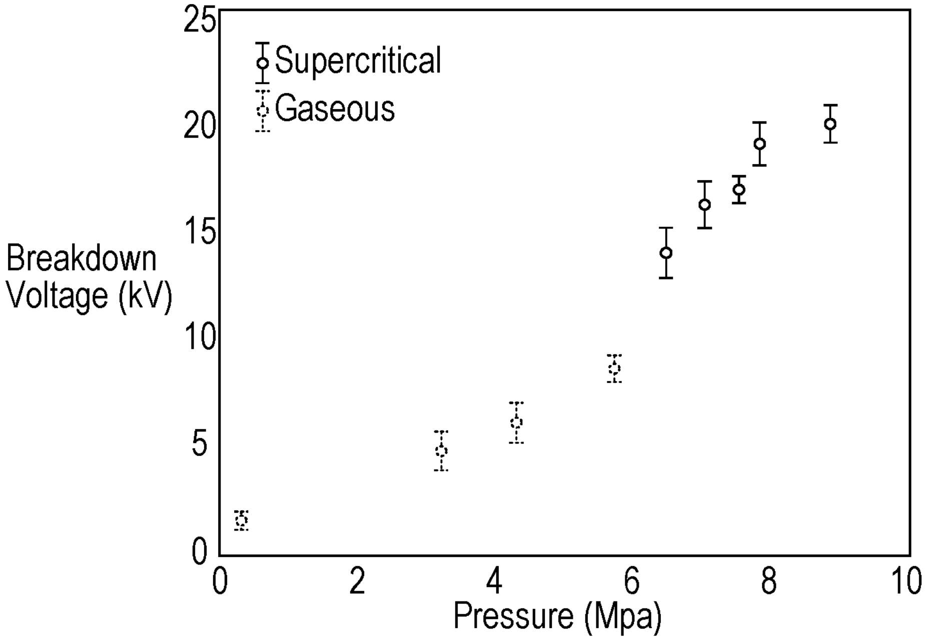
FIG. 9B is a chart of experimental results showing breakdown voltage as a function of pressure of a $CO_2$—$C_2H_6$ mixture at an azeotropic mixing ratio
Figure 9C:
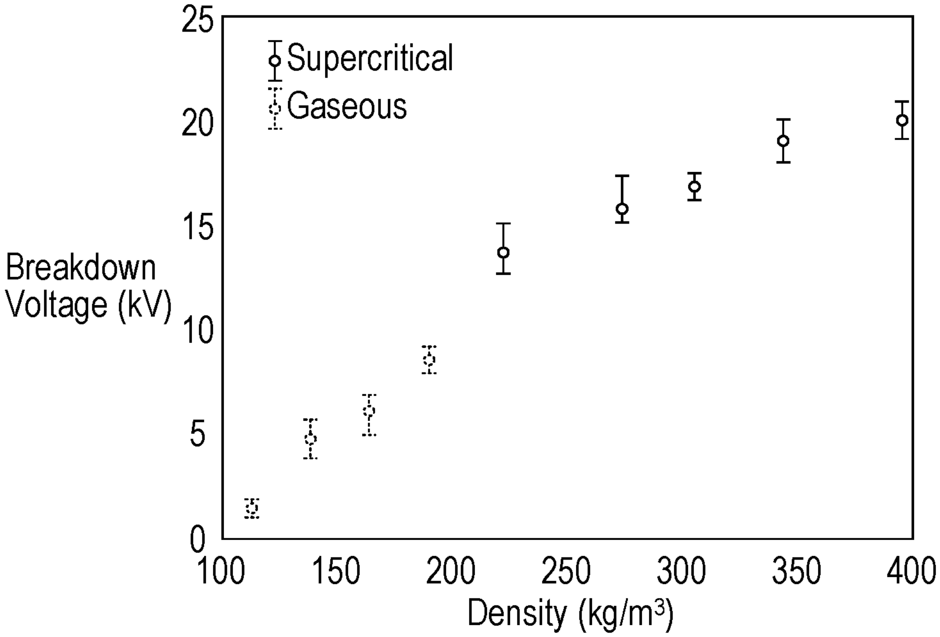
FIG. 9C is a chart of experimental results showing breakdown voltage as a function of density of a $CO_2$—$C_2H_6$ mixture at an azeotropic mixing ratio
Figure 9D:
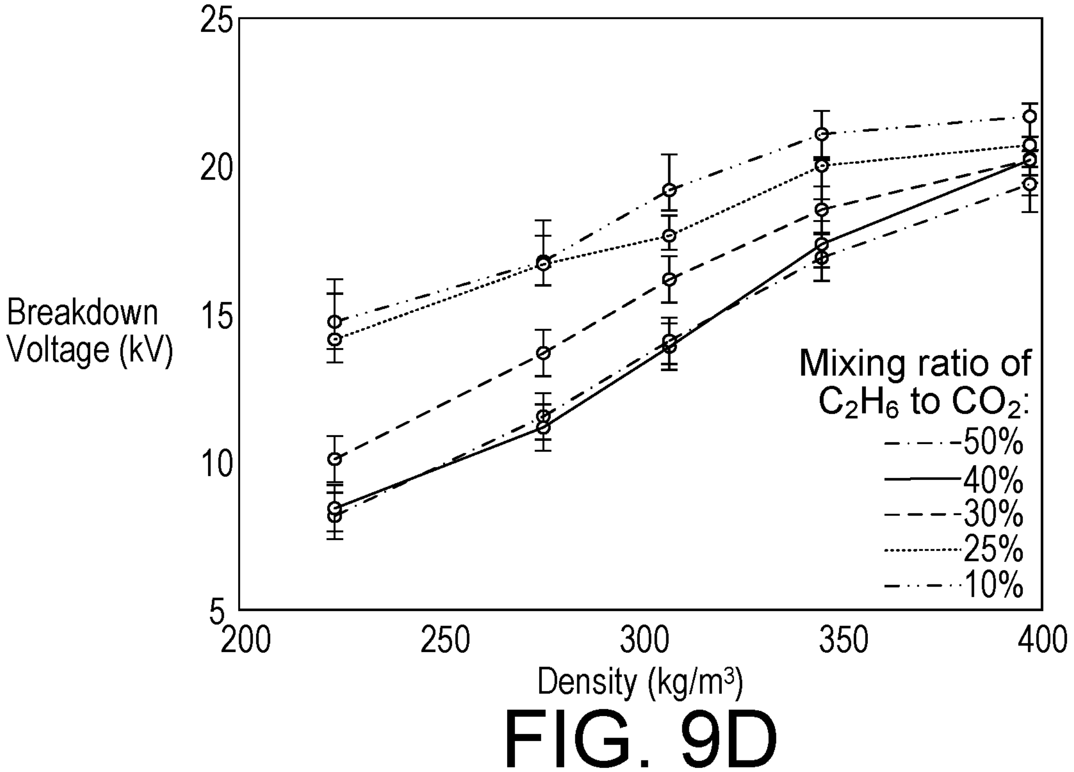
FIG. 9D is a chart of experimental results showing breakdown voltage at different mixing ratios as a function of density for different the mass percentages of $C_2H_6$.
Figure 9E:
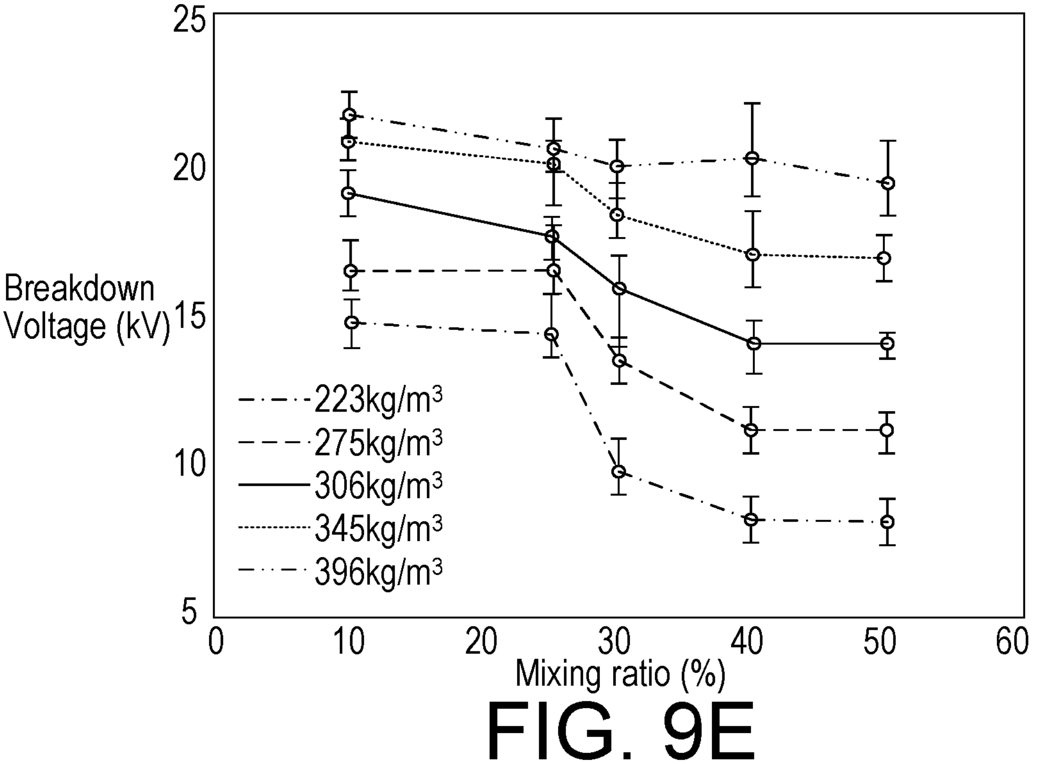
FIG. 9E is a chart of experimental results showing breakdown voltage of $CO_2$—$C_2H_6$ mixtures with varying $C_2H_6$ mixing ratio from 10% to 50% by mass into $CO_2$.

An anomalous breakdown behavior near the critical point of pure $CO_2$ was also observed in the $CO_2$—$C_2H_6$ mixture at the azeotropic mixing ratio, as shown in FIG. 9B, in which breakdown voltage is related to pressure, and in FIG. 9C, in which breakdown voltage is related to density. The measured breakdown voltage at different mixing ratios as a function of the density is shown in FIG. 9D. The breakdown voltages can also be presented as a function of the mixing ratio of $C_2H_6$ to $CO_2$, as shown in FIG. 9E. All of the breakdown values shown in FIGS. 9D and 9E were measured while the mixture was in a supercritical phase.

The average breakdown voltages tend decrease with an increase of $C_2H_6$ concentration. Also, the measured breakdown voltage of fluid mixtures tend to scatter more widely compared to the values of pure $CO_2$. At the lower density region between 220 kg/m$^3$ to 300 kg/m$^3$, the difference in the breakdown voltage of mixtures tends to be greater than in the higher density region. The data also indicate that breakdown voltages of different mixing ratios tend to saturate at higher density. The breakdown voltage of mixtures at the lower density region also shows a more pronounced reduction comparing with pure $CO_2$. For an azeotropic mixture of $CO_2$ and $C_2H_6$ (25% mass fraction of $C_2H_6$ and 75% mass fraction of $CO_2$), the breakdown voltage shows an average of 20.5% reduction compared to the dielectric strength of pure $CO_2$ in the vicinity the critical point of $CO_2$. At the higher density region far away from the critical point, the reduction of dielectric strength of the mixture drops to about 13.5% compared to pure $CO_2$.

The dielectric performance of supercritical $CO_2$ and $C_2H_6$ mixtures including their azeotropic mixture reveals that such mixtures can exhibit an average of dielectric strength exceeding that of sulfur hexafluoride ($SF_6$) gas by a factor of three ($SF_6$ being the most commonly used insulation gas.) Moreover, the breakdown anomaly is observed near the critical point due to the high density fluctuation caused by molecular clustering. Unique properties of SCF mixtures with respect to dielectric strength, viscosity, heat transfer capability, and tunable critical point can be useful in applications involving power and energy. SCF mixtures can also enable affordable particle accelerators for high energy physics and medical treatment.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A dielectric material with heat transfer properties, comprising:

(a) carbon dioxide; and (b) a second fluid selected from a list of fluids consisting of: sulfur hexafluoride; oxygen; hydrogen; trifluoroiodomethane; perfluoropentanone; perfluorohexanone; perfluoronitrile; hexafluoroethane; tetrafluoromethane; perfluoropropane; octafluorocyclobutane; ethane; and combinations thereof, mixed therewith so as to form a mixture, the mixture kept at a temperature and a pressure so that the mixture is maintained in a supercritical phase, wherein the mixture is maintained in the supercritical phase while being in contact with at least two conductive surfaces so as to act as a dielectric that insulates the at least two conductive surfaces from each other.

2. The dielectric material with heat transfer properties of claim 1, wherein the parameter comprises a selected one of: critical temperature and critical pressure.

3. The dielectric material with heat transfer properties of claim 1, wherein the second fluid includes ethane.

4. The dielectric material with heat transfer properties of claim 3, wherein the mixture includes 60% carbon dioxide and 40% ethane by volume.

5. The dielectric material with heat transfer properties of claim 3, employed as a dielectric in a disconnect switch.

6. The dielectric material with heat transfer properties of claim 1, wherein the second fluid includes oxygen.

7. The dielectric material with heat transfer properties of claim 6, wherein the mixture includes 80% carbon dioxide and 20% oxygen by volume.

8. The dielectric material with heat transfer properties of claim 6, employed as a dielectric in a circuit breaker.

9. An electrical device, comprising:

(a) a first conductive surface;

(b) a second conductive surface spaced apart from the first conductive surface;

(c) a dielectric fluid mixture disposed between and in contact with the first conductive surface and second conductive surface, the dielectric fluid mixture including a first fluid that includes carbon dioxide and a second fluid selected from a list of fluids consisting of: sulfur hexafluoride; oxygen; hydrogen; trifluoroiodomethane; perfluoropentanone; perfluorohexanone; perfluoronitrile; hexafluoroethane; tetrafluoromethane; perfluoropropane; octafluorocyclobutane; ethane; and combinations thereof; and (d) a container that contains the first conductive surface, the second conductive surface and the dielectric fluid mixture, wherein the container maintains the dielectric fluid mixture at a temperature and a pressure so that the dielectric fluid mixture is kept in a supercritical phase.

10. The electrical device of claim 9, wherein the first conductive surface and the second conductive surface are both parts of a disconnect switch.

11. The electrical device of claim 9, wherein the first conductive surface and the second conductive surface are both parts of a circuit breaker.

12. The electrical device of claim 9, wherein the first conductive surface and the second conductive surface are both parts of a Van de Graaff generator.

13. The electrical device of claim 9, wherein the first conductive surface and the second conductive surface are both parts of an electrostatic motor.

14. The electrical device of claim 9, wherein the first conductive surface and the second conductive surface are both parts of an electrostatic generator.

15. The electrical device of claim 9, wherein the first conductive surface and the second conductive surface are both parts of a particle accelerator.

16. The electrical device of claim 9, wherein the first fluid includes 60% carbon dioxide and wherein the second fluid 40% ethane by volume.

17. The electrical device of claim 9, wherein the first fluid includes 80% carbon dioxide and wherein the second fluid includes 20% oxygen by volume.

* * * * *